United States Patent Office 3,499,724
Patented Mar. 10, 1970

3,499,724
METHOD OF BRINE TREATMENT FOR REMOVAL OF IMPURITIES
Arvel O. Franz, Cartersville, Ga., assignor to Chemical Products Corporation, Cartersville, Ga., a corporation of Georgia
No Drawing. Filed May 23, 1968, Ser. No. 731,638
Int. Cl. C01d 3/16
U.S. Cl. 23—42                                      10 Claims

ABSTRACT OF THE DISCLOSURE

A process for treating brines to remove impurities, and in particular sulfates, comprising flocculating a suspension of a high surface area, high reactive barium carbonate which has been deflocculated with a phosphate deflocculant, by adding a small quantity of hot brine to the suspension. The resultant flocculated barium carbonate slurry is added to the brine to be treated whereby the barium carbonate reacts with sulfate impurities present in the brine to produce a rapid settling barium sulfate precipitate. The barium sulfate precipitate acts as a getter, removing trace element impurities present in the brine.

BACKGROUND OF THE INVENTION

The present invention is directed to a process of treating brines to remove sulfate and other impurities.

Sodium chloride, in the form of commercial salt or natural or artificial brines, is a common feed material for many industrial processes. In particular, sodium chloride solutions are used extensively in the production of chlorine and sodium hydroxide or metallic sodium. Nearly all commercial salts and brines contain, as contaminates, greater or lesser amounts of impurities, including inter alia sulfates. Generally, the sulfate impurities are present in the form of calcium sulfates or sodium sulfates, or both.

In virtually all processes employing brines, the impurities normally present in the salt are undesirable; the degree to which impurities may be tolerated depends upon the type of process used and the method of plant operation. For example, in the manufacture of chlorine and sodium hydroxide using a diaphragm type cell installation, impurities are only mildly undesirable. In such processes, impurities may often be satisfactorily controlled simply by controlling the salt dissolvers or avoiding a buildup of impurities in the brine solution by discarding all or part of the spent brine. On the other hand, in mercury cell type units a large percentage of the brine is continuously recycled and successful operation with respect to chlorine purity requires rigid control of the over-voltage of the mercury cell. In operations of this type, the purity of the brine must be rigorously controlled.

In processes where it is important to control the purity of the brines, it is common to control the sulfate content by precipitation of all, or part, of the sulfate with barium carbonate. The addition of barium carbonate to brines not only serves to remove sulfates, but also to remove a wide variety of undesirable trace elements, such as iron, vanadium, chromium, and manganese, which are extremely deleterious to the operation of mercury cells. Barium sulfate precipitated from brine by the addition of barium carbonate functions as a "getter" to occlude or adsorb such trace elements. The calcium content of brine may be controlled by means of sodium carbonate additions.

It has been found that the activity of barium carbonate in the precipitation of sulfates from brine solutions increases as the surface area of the barium carbonate increases. The relationship between surface area and reactivity not only involves the rate of reaction, but also total reactivity over a long reaction period. Since, generally, in brine treatment systems there is only a limited amount of total dwell time available for reaction and precipitation of impurities, it is apparent that it is desirable to utilize the most reactive barium carbonate available. Furthermore, it is known that barium sulfate rapidly precipitated with high surface area barium carbonate has a large surface area and enhanced tendencies to occlude or adsorb trace element impurities.

For ease of handling, it is desirable to employ barium carbonate in the form of a pumpable slurry. To ensure accurate metering of reactants into the brine system, and to avoid introduction of unduly large amounts of water, it is desirable that any barium carbonate slurry employed be stable and have a high solids content.

In summary, for the treatment of brines, a stable, fluid, pumpable, high solids content slurry of a highly reactive, large surface area barium carbonate is desirable. Deflocculated barium carbonate slurries, such as described in U.S. Patent No. 3,322,683, have all of the above recited properties. Therefore, deflocculated barium carbonate slurries such as described in U.S. Patent No. 3,322,683, should be useful in brine purification systems, provided that the deflocculant employed does not introduce undesirable impurities into the brine system.

Alkali metal and ammonium phosphates, including metaphosphates, pyrophosphates, polyphosphates, etc., are known as deflocculants for barium carbonate slurries. It is further known that phosphates are not deleterious, and possibly beneficial, in mercury cell systems. It would therefore appear that barium carbonate slurries, such as described in U.S. Patent No. 3,322,683, which have been deflocculated with phosphates, would be eminently well suited for use in brine purification systems.

However, it was found that when barium carbonate suspensions, such as described in U.S. Patent No. 3,322,683, which had been deflocculated with phosphate deflocculants, were added to brines, using normal vigorous agitation, the deflocculated barium carbonate remained deflocculated and the barium sulfate produced by the reaction was also deflocculated. This was somewhat surprising because it is known that, in general, salts, and particularly chlorides, act as flocculants for most deflocculated barium carbonate slurries.

The deflocculated barium carbonate suspension demonstrated the expected high reactivity with the sulfate impurities present in the brine. Virtually all of the sulfate present in the brine reacted within one hour. However, the settling and filtration properties of the resultant deflocculated barium sulfate were such as to totally preclude using deflocculated barium carbonate as a precipitant in commercial operations.

It is apparent deflocculated barium carbonate slurries, such as described in U.S. Patent No. 3,322,683, which have been deflocculated with phosphates would be very useful as precipitants in brine purification processes if the problems with respect to settling and filtration of the resultant barium sulfate could be overcome.

SUMMARY OF THE INVENTION

It has been found that deflocculated barium carbonate may be advantageously used to remove sulfate impurities from brines if the process of the present invention is followed.

A deflocculated suspension of a high surface area, high reactivity barium carbonate is prepared employing a phosphate deflocculant. The resultant suspension may be flocculated by adding a minor amount of hot brine. The resultant flocculated barium carbonate slurry is added to the brine to be treated; the barium carbonate reacts with the sulfate impurities present in the brine, producing barium sulfate in a form which rapidly settles.

By following the process of the present invention, not only is it possible to obtain the advantages which inure in the use of a stable, pumpable, high solids content slurry, the high reactivity of deflocculated barium carbonate is retained. Furthermore, barium sulfate, precipitated with barium carbonate which has been deflocculated and then flocculated (referred to herein as reflocculated barium carbonate), is well flocculated and settles even more rapidly than does barium sulfate precipitated with barium carbonate which has not been deflocculated.

DETAILED DESCRIPTION OF THE INVENTION

Deflocculated suspensions of barium carbonate, such as described in U.S. Patent No. 3,322,683, may be advantageously used in the process of the present invention.

The barium carbonate particles employed in the process of the present invention must have a large surface area. As used herein, the expressions "large surface area" or "high surface area" refer to the surface area possessed by barium carbonate particles having an average particle size in the range of from about 0.25 to about 5.0 microns. The expression "average particle size" as used herein refers to average particle size as determined by a dye absorption method such as that set forth in the Journal of the American Chemical Society, vol. 59, pages 1639–1643 (1937). This method is based on the absorption of wool violet dye by the particles.

The barium carbonate particles employed in the process of the present invention must also have a high reactivity. A suitable reactivity would be at least about 65%. As used herein, "reactivity" is defined as that percent of barium carbonate which will react with an excess of calcium sulfate present as an 80% saturated (at room temperature) solution, within a 24-hour period when subjected to a gentle boil under reflux.

Suitable deflocculants are the alkali metal and ammonium phosphate deflocculants, including metaphosphates, pyrophosphates, polyphosphates, etc. Sodium phosphates are preferred, as obviously the addition of sodium ions to the brine will have no deleterious effect. Calgon (sodium hexametaphosphate) is particularly well suited for use in the process of the present invention.

The hot brine which is added to the deflocculated slurry is preferably in the temperature range of from 90° to 100° C. The amount of hot brine which is added to the deflocculated suspension is preferably between about 3 to about 30 volumes based on the volume of the barium carbonate suspension. This is, of course, a very small quantity of brine compared to the total amount of brine to be treated.

When the hot brine is added to a barium carbonate slurry which has been deflocculated with a phosphate such as Calgon, the phosphate will hydrolyze to a normal phosphate. The hydrolysis of the deflocculant is important to prevent surface active behavior in the brine system, e.g. prevent the deflocculant from modifying the crystal structure or solubilizing calcium carbonate during a calcium carbonate precipitation step. The flocculation of the barium carbonate suspension is not necessarily due to the hydrolysis of the deflocculant, but is a "salting out" effect occuring almost instantly.

The vessel in which the hot brine is mixed with the deflocculated barium carbonate slurry should be of such a size that the brine-barium carbonate slurry mixture is retained therein for a sufficient amount of time so that a large portion of the deflocculant is hydrolyzed. When the flocculated barium carbonate is mixed with the brine to be treated, the temperature and dwell time in the purification portion of the system should be adequate to complete the hydrolysis of the deflocculant. Thus, when the brine is introduced into the actual manufacturing cycle, substantially all of the deflocculant should be hydrolyzed to normal phosphates.

The amount of deflocculant used initially to deflocculate the barium carbonate is preferably an amount sufficient to disperse the barium carbonate in the water employed, but generally not in excess of 2% by weight of the barium carbonate present. Suitable dispersions can be obtained using larger amounts of deflocculant, but it is preferred to keep the concentration low so as to avoid any buildup of excess phosphate in the system and to allow hydrolysis and flocculation to take place in relatively short periods of time.

In some instances, it is desirable to add a sufficient amount of the barium carbonate slurry to the brine to be treated so that there is a slight excess of barium carbonate present over the amount theoretically required to react with all of the sulfate impurities present in the brine. Greater or lesser amounts of brine may be advantageously used, however, under various circumstances. For example, if the brine is to be used in a process in which more than trace amounts of sulfate may be tolerated, less than the amount of barium carbonate theoretically required to react with all of the sulfate impurities present in the brine may be employed. Often brines may be advantageously treated with less than the amount of barium carbonate theoretically required to react with all of the sulfate impurities present.

Preferably the deflocculated barium carbonate suspension will have a high solids content (i.e., in excess of 65% by weight $BaCO_3$). By using high solids content suspensions, the introduction of excessive amounts of extraneous water into the brine, and the handling of large volumes of liquid, is avoided. However, the use of the high solids content suspensions is not critical; relatively dilute suspensions may be employed, particularly with concentrated brines.

It has been found, surprisingly, that when refloccuated barium carbonate is used as a precipitant, a more rapid settling precipitate is formed than is formed with barium carbonate which has never been deflocculated. Table I, set out below, lists the clarity of supernatant liquors measured at 550 millimicrons with a Bausch & Lomb Spectronic 20 spectrophotometer. The values given represent a percentage of transmission compared to distilled water as 100%.

TABLE I

| Material | Percent transmission at 550 mm. | | Sulfate Reduction | |
| --- | --- | --- | --- | --- |
| | 1 hour at 70° C. | 3 hours at 70° C. | G. $SO_4$=l. | Percent |
| Undeflocculated barium carbonate | 81 | 93.5 | 3.8 | 86 |
| Deflocculated barium carbonate | 50 | 81 | 3.8 | 86 |
| Deflocculated and reflocculated barium carbonate | 86 | 97 | 3.9 | 88 |

As may be seen from the above table, treatment with reflocculated barium carbonate (the process of the present invention) results in a greater degree of sulfate removal in a given period of time than is obtained by treatment with barium carbonate which has not been deflocculated or which has been deflocculated but not reflocculated.

The barium carbonate employed to obtain the data set forth in the above table had an average particle size of 1.1 microns as determined by dye absorption and a reactivity of 88%. The flocs of barium sulfate (along with any unreacted barium carbonate) were clearly visible to the naked eye when the treatment was conducted with reflocculated barium carbonate. When untreated, undeflocculated barium carbonate was employed, the resultant barium sulfate settled fairly rapidly, but no flocs distinguishable with the naked eye were formed. when deflocculated barium carbonate was employed, the resultant solids resembled a haze to the naked eye; under a microscope particles were resolvable showing distinct Brownian movement.

Qualitatively, the flocs produced from reflocculated barium carbonate exhibited somewhat different properties depending on the amounts of hot brine employed. When three volumes of hot brine per volume of barium carbonate slurry were employed, the resultant slurry was very thick and dispersed with great difficulty. The flocs produced were very small, but settled very well. When ten volumes of hot brine per volume of barium carbonate was employed, the slurry was thin and easily manageable. The flocs produced were clearly visible and exhibited excellent settling properties. When thirty volumes of hot brine per volume of barium carbonate slurry were employed, the resultant slurry was very thin. The flocs produced were very large and apparently quite "tender" since they were readily broken up by vigorous agitation. Settling was, in general, good, but some of the larger flocs seemed to almost float in the brine in the manner of a gel.

While it is not desired to be bound by any theory as to the reason for the advantages obtained by the process of the present invention, it is believed that the process of reflocculating deflocculated barium carbonate produces very large, bulky, and open "brush-heap" aggregates. The open structure of these aggregates permits rapid and complete reaction, while their size encourages rapid settling. Normal undeflocculated barium carbonate probably also comprises similarly shaped aggregates, but these aggregates are probably neither as large nor as open as the aggregates produced by reflocculating deflocculated barium carbonate.

The following specific example further illustrates the present invention. A deflocculated barium carbonate slurry is prepared by adding approximately one gram of Calgon to 1,000 grams of a partially dried filter cake containing 720 grams dry weight of a barium carbonate having a particle size of about 1.0 microns and reactivity of about 85%. This mixture is stirred until a smooth dispersion having the consistency of thin cream is obtained. The resultant dispersion contains about 2.4 pounds of barium carbonate per pound of water. A brine is prepared containing 300 grams per liter sodium chloride and 7 grams per liter sulfate impurities, present as sodium sulfates, along with minor amounts of other impurities. Ten volumes of this brine, at a temperature of approximately 90° C., is added to one volume of the deflocculated barium carbonate slurry. After addition of the hot brine, the mixture is allowed to stand until flocs visible with the naked eye have formed. A sufficient amount of the resultant flocculated barium carbonate slurry is added to the brine to be treated so that there is a slight excess of barium carbonate present over the amount theoretically required to react with all of the sulfate impurities present in the brine. The resultant mixture is pumped to a settler where it is given a dwell time of about two hours. Subsequently the purified brine is decanted from the settler. An amount in excess of 80% of the sulfate initially present in the brine is removed, along with substantial quantities of the trace impurities also present in the brine.

What is claimed:

1. A method of treating brine containing sulfate impurities comprising
   (A) flocculating deflocculated suspension of a high surface area, high reactivity barium carbonate, which suspension has been deflocculated with phosphate deflocculant, by adding to said suspension a small quantity of hot brine,
   (B) adding the resultant flocculated barium carbonate slurry to the brine to be treated, which brine contains sulfate impurities, whereby the barium carbonate reacts with sulfate impurities present in said brine to produce a barium sulfate precipitate, and
   (C) recovering the resultant treated brine.

2. The process of claim 1 in which the barium carbonate of said deflocculated suspension has an average particle size of from about 0.25 to about 5.0 microns.

3. The process of claim 1 in which the barium carbonate of said deflocculated suspension has a reactivity of at least about 65%.

4. The process of claim 1 in which said hot brine which is added to the said deflocculated suspension of barium carbonate is within the temperature range of about 90° C. to about 100° C.

5. The process of claim 1 in which about three to about thirty volumes of said hot brine per volume of deflocculated suspension of barium carbonate is added to said deflocculated suspension of barium carbonate.

6. The process of claim 1 in which said phosphate deflocculant is sodium hexametaphosphate.

7. The process of claim 6 in which said hot brine which is added to said deflocculated suspension of barium carbonate has had a sufficient temperature, and is allowed to remain in contact with said suspension for a sufficient amount of time, to substantially hydrolyze said sodium hexametaphosphate.

8. The process of claim 1 in which said deflocculated suspension of barium carbonate contains said phosphate deflocculant in an amount sufficient to disperse said barium carbonate in said suspension, but not in excess of about 2% by weight of the barium carbonate present.

9. The process of claim 1 in which a sufficient amount of said flocculated barium carbonate slurry is added to said brine to be treated so that there is an excess of barium carbonate present over the amount theoretically required to react with all of said sulfate impurities present in said brine.

10. The process of claim 1 in which said deflocculated suspension of barium carbonate has a high solids content.

References Cited

UNITED STATES PATENTS

| | | | |
|---|---|---|---|
| 2,191,411 | 2/1940 | Pierce | 23—89 X |
| 2,906,600 | 9/1959 | Roland et al. | 23—42 |
| 3,322,683 | 5/1967 | Lester | 252—313 |

MICHAEL E. ROGERS, Primary Examiner

U.S. Cl. X.R.

23—89

UNITED STATES PATENT OFFICE
CERTIFICATE OF CORRECTION

Patent No. 3,499,724           Dated  March 10, 1970

Inventor(s) Arvel O. Franz

It is certified that error appears in the above-identified patent and that said Letters Patent are hereby corrected as shown below:

Column 4, TABLE I, that portion of the TABLE reading "G.$SO_4$=1." should read -- g.$SO_4^=$/l. --.

SIGNED AND
SEALED
JUL 28 1970

(SEAL)
Attest:

Edward M. Fletcher, Jr.
Attesting Officer

WILLIAM E. SCHUYLER, JR.
Commissioner of Patents